United States Patent [19]

Lamb, Sr. et al.

[11] Patent Number: 4,810,445

[45] Date of Patent: Mar. 7, 1989

[54] PROCESS FOR MAKING PRESSBOARD FROM POLY-COATED PAPER

[75] Inventors: Vernon L. Lamb, Sr., Sparta; Roger D. Boden, Sr., Pierson, both of Mich.

[73] Assignee: Fortifiber Corporation, Los Angeles, Calif.

[21] Appl. No.: 912,639

[22] Filed: Sep. 26, 1986

[51] Int. Cl.$^4$ .................... B29C 43/30; B32B 31/20
[52] U.S. Cl. ..................... 264/112; 264/115; 264/126; 264/DIG. 69; 156/62.2; 156/301
[58] Field of Search ............. 264/112, 113, 123, 125, 264/126, 121, DIG. 69, 115; 425/83, 115, 335, 343; 156/62.2, 301

[56] References Cited

U.S. PATENT DOCUMENTS

| | | |
|---|---|---|
| 1,185,142 | 5/1916 | Stewart . |
| 1,862,688 | 6/1932 | Loetscher . |
| 2,057,167 | 10/1936 | Sherman . |
| 2,181,556 | 11/1939 | Wells . |
| 2,222,633 | 11/1940 | Sheesley . |
| 2,619,681 | 12/1952 | Baker et al. . |
| 3,011,938 | 12/1961 | Chapman . |
| 3,021,244 | 2/1962 | Meiler . |
| 3,032,820 | 5/1962 | Johnson . |
| 3,183,141 | 5/1965 | Holden et al. . |
| 3,235,530 | 2/1966 | Crouch et al. . |
| 3,309,444 | 3/1967 | Schueler . |
| 3,367,828 | 2/1968 | Carter et al. . |
| 3,511,750 | 5/1970 | Hider . |
| 3,718,536 | 2/1973 | Downs et al. ............ 264/134 |
| 3,857,752 | 12/1974 | McCoy ................ 161/161 |
| 3,977,928 | 8/1976 | Odagiri et al. . |
| 4,086,313 | 4/1978 | Axer ..................... 264/123 |
| 4,097,209 | 6/1978 | Garrick ................. 425/83.1 |
| 4,111,730 | 9/1978 | Balatinecz ............. 156/62.2 |
| 4,111,744 | 9/1978 | Reiniger ................ 264/126 |
| 4,146,660 | 3/1979 | Hall et al. ............... 428/2 |
| 4,382,758 | 5/1983 | Nopper ................. 425/83.1 |
| 4,396,566 | 8/1983 | Brinkmann ............ 264/DIG. 69 |
| 4,597,930 | 7/1986 | Szal . |

FOREIGN PATENT DOCUMENTS

| | | |
|---|---|---|
| 2136444 | 7/1971 | Fed. Rep. of Germany ...... 264/126 |
| 2925630 | 1/1981 | Fed. Rep. of Germany . |
| 141384 | 7/1921 | United Kingdom . |

OTHER PUBLICATIONS

Abstract Bulletin Of The Institute Of Paper Chemistry, vol. 48, No. 9, Mar. 1978, p. 982, abastract No. 9155; J. C. W. Evans: "New Japanese dry-forming process [is proven in commercial operation]", & Pult Paper 51, No. 4: 76-77 (Apr. 1977) & Pulp Paper Intern. 19, No. 5: 58-29 (May 1977).
Abstract Bulletin, vol. 49, No. 8, Feb. 1979, p. 793, abstract No. 7239; & JP-A-77 20 587 (Honshu Seishi K.K.) 04-06-1977.
Abstract Bulletin Of Paper Chemistry, vol. 49, No. 7, Jan. 1979, p. 700, abstract No. 6388; & JP-A-77 20 588 (Honshu Seishi K.K.) 04-06-1977.

Primary Examiner—James Lowe
Assistant Examiner—Jeremiah F. Durkin, II
Attorney, Agent, or Firm—Price, Heneveld, Cooper, DeWitt & Litton

[57] ABSTRACT

A method for continuously forming a pressboard product from shredded scrap paper having a thermoplastic coated thereon. The shredded paper is deposited between two continuous facing sheets. The sandwiched construction is heated using radiant or convection heat and then compressed to fuse the shredded paper together.

7 Claims, 1 Drawing Sheet

PROCESS FOR MAKING PRESSBOARD FROM POLY-COATED PAPER

BACKGROUND OF THE INVENTION

The present invention relates to apparatuses and methods for manufacturing pressboard, particularly from shredded paper coated with a thermoplastic material.

Papers coated with a thermoplastic material (poly-coated papers) are utilized in a variety of applications. In one such application, kraft paper is coated with polyethylene to create roll headers utilized in the paper manufacturing industry. The use of such headers is discussed in copending application Ser. No. 642,569, filed Aug. 20, 1984, by Lamb, and entitled ROLL HEADER PLATEN, the disclosure of which is incorporated by reference. The thermoplastics used in coating the papers are readily obtained, for example through the recycle of plastic milk bottles and the like, and provide an inexpensive heat-activated adhesive medium.

The use of poly-coated papers inevitably creates waste or scrap paper generated from cutting the desired size blanks from the sheet stock. For example, the poly-coated roll headers are round and therefore leave a relatively large offal portion when cut from rectangular sheet stock. Disposal of the scrap paper is difficult, time consuming, and/or expensive. One option is to dispose of the scrap paper in a land fill. This is expensive both in terms of transporting the paper to the land fill and also in land fill fees. A second option involves incinerating the scrap paper. However, certain regulatory agencies are prohibiting such incineration in many states. Third, the waste scrap paper can be fabricated into a pressboard.

One such apparatus and method for producing pressboard from scrap poly-coated paper is disclosed in U.S. Pat. No. 3,718,536, issued Feb. 27, 1973, to Downs et al, and entitled COMPOSITE BOARD AND METHOD OF MANUFACTURE. The Downs method includes, first, shredding the paper into ribbons of up to two inches in width by eight inches in length; second, air-forming the shredded paper into a bat; third, heating the bat above the softening point of the thermoplastic material; fourth, pressing the heated bat to cause the thermoplastic material to flow and consolidate the bat; and, fifth, cooling the consolidated bat to cure the bat. However, the Downs apparatus and process are capable only of batch processing the scrap paper, restricting throughput and requiring excessive labor in its operation. Although the Downs patent represents that the composite board can be manufactured continuously (column 5, lines 31–42), no operative apparatus or method is disclosed for a continuous implementation.

SUMMARY OF THE INVENTION

The aforementioned problems are overcome in the present invention wherein an apparatus and method are provided for continuously forming a pressboard product from paper coated with a thermoplastic material. The method includes the steps of, first, forming a continuous bat of the shredded paper product; second, heating the shredded paper using either convection or radiant heat to a temperature above the softening point of the thermoplastic; and, third, pressing the heated bat to cause the softened thermoplastic to flow and to compress and bond the shredded paper together. Preferably, the continuous bat includes a pair of continuous facing sheets on opposite sides thereof to provide a finished surface to the resultant product. Optionally, the bat is cooled after compressing to facilitate setting the thermoplastic and maintain the bat in its compressed state.

The present apparatus and method enables a pressboard product to be continuously formed from scrap poly-coated paper. The invention therefore not only alleviates the disposal problem associated with the scrap, but produces a useful article therefrom. It is believed that the pressboard fabricated according to the present invention can be utilized as a substitute for chip board or gypsum board if fabricated in the range of ½ inch thick and as a substitute for corrugated cardboard if fabriated in the range of 60 point to 80 point thick.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
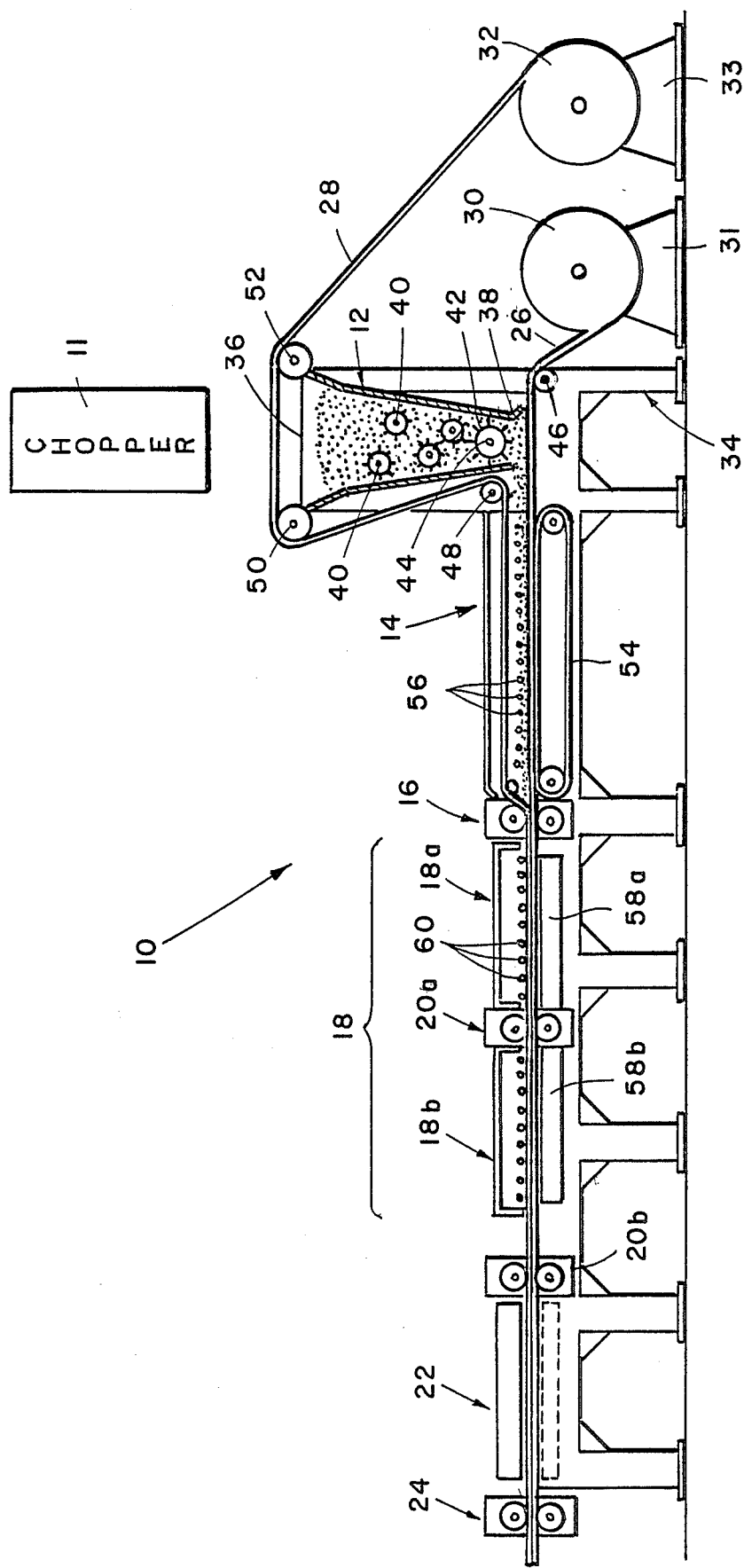
FIG. 1 is an elevational view of the pressboard manufacturing system of the present invention.

A system for manufacturing pressboard from scrap paper coated with a thermoplastic material is illustrated in the drawings and generally designated 10. The system includes chopper 11, a hopper 12, a first heating unit 14, a first pair of pinch rollers 16, a second heating unit 18 having a second pair of pinch rollers 20a, a third pair of pinch rollers 20b, a cooling unit 22, and a pair of pulling rollers 24. The shredded paper stored within the hopper 12 is deposited between a pair of opposite continuously moving facing sheets 26 and 28 to form a bat for conveyance through the system 10. The bat is repetitively heated and pressed as it passes from right to left as illustrated in FIG. 1. The heating elevates the temperature of the bat so that the thermoplastic is softened and/or flowable; and the pinch rollers compress the bat to force the thermoplastic to flow through the bat and adhere the shredded paper together and to the facing sheets 26 and 28. The cooling lowers the temperature to facilitate setting of the thermoplastic and maintain the bat in its compressed and relatively rigid state.

As used herein, the term "thermoplastic material" means polymerized resins which are thermoplastic in nature (i.e. becomes softened and flowable upon heating above their thermal softening point without decomposition). Thermoplastics are a well-known class of materials and include polymerized olefins (e.g. polyethylene, polypropylene, and polybutylene) and polymerized vinyls (e.g. polyvinyl chloride, polyvinl acetate, and various vinyl polymers). The major thermoplastic material used in coating paper is polyethylene, for example recycled milk cartons. The softening temperature of polyethylene is approximately 280 degrees F.

Turning specifically to the construction of the system 10, a pair of paper rolls 30 and 32 are supported on conventional back stands 31 and 32, respectively. Preferably, the paper is an uncoated 42-pound kraft in any width up to 10 feet. Alternatively, the kraft paper can be poly-coated on the side facing the shredded paper to facilitate adhesion of the facing sheets thereto. Feed rollers 46, 48, 50, and 52 are supported by the stand 34 in conventional fashion. The lower facing sheet or web 26 from spool 30 is fed over roller 46 to the lower end 38 of the hopper 12. The upper facing sheet or web 28 from the spool 32 is fed over rollers 52, 50, and 48, sequentially, to be positioned above the lower facing sheet 26 as it exits from beneath the hopper 12.

The chopper 11 cuts, grinds, mills or otherwise separates the waste paper into pieces approximately three-eighths inch square. Other sizes can be produced depending on the product to be manufactured. "Shredded" refers to sufficient reduction in size to be flowable through a hopper. The shredded paper is a 42-pound kraft paper coated with polyethylene at a rate of approximately 14.4 pounds per basis (i.e. 3,000 square feet).

The hopper 12 is supported on a stand 34 and is conventional in construction. The hopper has a large open upper end 36, into which the shredded material from the chopper 11 is deposited, and a restricted lower end 38. Rotatable agitators 40 within the hopper 12 insure that the shredded paper is continually loosened and separated as it drops through the hopper to prevent hang-ups or clogging. A rotatable dispensing roller 42 is carried by the feed shaft 44 to dispense the shredded paper from the hopper 12. The agitators and dispensing roller extend the full 10-foot width of the system. The rate at which the paper is dispensed depends upon the desired thickness of the resultant product and the weight of the paper.

The first heating unit 14 optionally includes a conveyor belt 54 and radiant heaters 56. The radiant heaters include conventional radiant heating elements providing approximately 264,000 watts of radiant heat evenly distributed ove,r its ten-feet-by-ten-feet surface. The temperature of the bat traveling through the first heating unit 14 is preferably raised to at least 300 degrees F. The conveyor 54 comprises insulated chain link fence. Alternatively, it is envisioned that a teflon belt could be used. The conveyor 54 supports the bat as it is conveyed through the heating stage 14.

The first pinch rollers 16 are conventional pinch rollers approximately 10 feet wide and providing a pressure of 73–105 pounds per linear inch (pli). The bat exiting the first heating stage 14 passes between the pinch rollers 16 to compress the bat and cause the thermoplastic to flow throughout the shredded paper. The greater density imparted to the bat by the pinch rollers also enhances the rigidity of the resultant product. The rollers 16 optionally may be heated to a temperature above the softening point of the thermoplastic to prevent chilling of the bat and premature setting of the softened thermoplastic material.

From the pinch rollers 16, the bat continues through the second heating unit 18 which includes two halves 18a and 18b, each of which is five feet long and ten feet wide. Each half 18a and 18b includes a lower heated platen 58a and 58b and upper radiant heaters 60. Each lower platen 58 is a conventional aluminum platen having a surface temperature of approximately 425–500 degrees F. The radiant heaters 60 incorporate conventional radiant heat elements providing approximately 96,000 watts of heat evenly distributed over the combined ten-foot by ten-foot surface. The temperature of the bat entering the second heating stage is approximately 300 degrees F. The temperature of the bat exiting the second heating stage 18 is approximately 400 degrees F.

Two pairs of pinch rollers 20a and 20b are provided—rollers 20a are positioned within the second heating unit 18 between halves 18a and 18b, and rollers 20b are adjacent the exit end of the heating unit 18. Both pairs 20a and 20b are approximately 10 feet long and provides a pressure of 73–105 pli. The rollers 20 further compress the bat to enhance the distribution of the thermoplastic material throughout the shredded paper and to further improve the density and rigidity of the resultant product.

From the pinch rollers 20, the bat optionally enters the cooling stage 22. The construction of the cooling stage is not yet finalized, but is anticipated to provide cooling by blowing water-cooled air onto the moving bat to prevent separation. Preferably, the temperature of the bat will be reduced to approximately 200 degrees F. as it exits the cooling stage. Conceivably, the cooling unit 22 may include a series of pinch rollers through which the bat passes to maintain pressure on the bat during cooling.

If the cooling stage 22 is including pulling rollers 24 are provided adjacent the cooling unit. As with the other rollers, the pulling rollers 24 are approximately 10 feet long to fully grip the bat and provide a pressure of 73–105 pli. In the preferred embodiment, all rollers 16, 20a, 20b, and 24 are powered at the same speed to provide the motive force drawing the bat through the system 10.

Operation

The present system enables the continuous fabrication of a pressboard product from scrap poly-coated paper. The chopper 11 shreds the scrap paper into pieces approximately three-sixteenths inch square. This size has been found to be optimal. The shredded paper is blown or otherwise conveyed from the chopper 11 to the hopper 12.

To initiate pressboard fabrication, all rollers 16, 20a, 20b, and 24 are actuated to begin conveying the facing sheets at approximately 75–150 feet per minute. The feed shaft 44 is rotated to deposit the shredded paper onto the lower facing sheet 26. As noted above, the rate at which the shredded paper is deposited is dependent upon the desired thickness of the resultant product, the desired density of the resultant product, and the nature of the shredded paper. The upper facing sheet 28 is brought to a position directly above the radiant elements 56 in the first heating unit 14. Alternatively, the upper sheet can be conveyed below the elements 56, but this is believed to impede heating of the shredded paper.

The bat is conveyed through the first heater unit 14 wherein its temperature is elevated to approximately 300 degrees F. As noted, the preferred thermoplastic has a softening temperature of 280 degrees F. so the temperature rise created in the first heater unit is sufficient to soften the thermoplastic material.

Although radiant heating is disclosed in conjunction with the heating units 14 and 18, convection heating could also be used. However, the use of radiant or convection heating is of extreme importance to the proper operation of a continuous manufacturing process. The conduction heating of the known batch systems do not supply the desired heat transfer for a commercially viable continuous system.

As the facing sheets and shredded paper exit the first heating unit, the upper sheet 28 is brought down on the shredded paper to create a sandwich construction bat. The heated bat is then compressed between the pinch rollers 16 to force the melted thermoplastic to flow throughout the shredded paper. The compressive force also increases the density of the bat compacting the shredded paper.

The bat then passes through the second heater unit 18 wherein its temperature is further raised to approximately 400 degrees F., well above the softening point of the thermoplastic material. Half way through the second heating unit 18, the bat is further compressed between the rollers 20a. The fully heated bat is then compressed between the rollers 20b to cause further flowing of the melted thermoplastic and to further compress the shredded paper.

The fully compressed product then passes through the cooling unit 22 wherein the temperature of the bat is lowered to a point below the melting point of the thermoplastic, preferably 200 degrees F. to bind the compressed shredded paper together and to the facing sheets 26 and 28. If provided, the continuing compressive force provided by the rollers in the cooling unit 22 prevent "spring back" of the bat.

The continuous bat exiting the pulling rollers 24 is then cut to desired size sheets and stacked for subsequent storage and/or transportation.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A method of fabricating a pressboard product from shredded paper coated with a thermoplastic substance comprising:
    conveying a lower continuous paper web along a path;
    depositing the shredded paper onto the lower continuous web;
    introducing an upper continuous paper web onto the shredded paper, whereby the shredded paper is located between the upper and lower continuous webs;
    heating the deposited shredded paper directly using radiant heat while the shredded paper remains uncompressed;
    pressing the upper and lower webs with the shredded paper therebetween subsequent to said heating to compress and bond the shredded paper together and to the upper and lower continuous webs.

2. A method as defined in claim 1 further comprising cooling the pressed bat to a temperature below the softening temperature of the thermoplastic.

3. A method as defined in claim 1 wherein said pressing step includes pressing the bat between pinch rollers heated to a temperature above that of the softening temperature of the thermoplastic, whereby the thermoplastic does not solidify during said pressing step.

4. A method of manufacturing a continuous pressboard product from a paper product coated with a thermoplastic comprising:
    shredding the coated paper;
    introducing the shredded paper between a pair of continuous paper facing sheets on a conveyor means for conveying the paper along a path;
    heating the shredded paper without compressing the shredded paper using direct radiant heat to a temperature sufficient to soften the thermoplastic thereon;
    compressing the facing sheets and the heated paper;
    cooling the compressed paper to set the thermoplastic and thereby bind the compressed paper together and to the facing sheets.

5. A method as defined in claim 4 wherein said compressing step includes compressing the paper using roller means heated to a temperature above the softening temperature of the thermoplastic to prevent solidifying of the thermoplastic as it is compressed by said roller means.

6. A method as defined in claim 1 wherein said heating step occurs prior to the upper web contacting the shredded paper.

7. A method as defined in claim 4 wherein said heating means occurs prior to contact between shredded paper and at least one of the facing sheets.

* * * * *